(12) United States Patent
Hutchinson

(10) Patent No.: US 8,869,705 B2
(45) Date of Patent: Oct. 28, 2014

(54) RAIL-SUPPORTED TRAILER APPARATUSES, SYSTEMS, AND METHODS

(71) Applicant: Swanson Industries, Inc., Morgantown, WV (US)

(72) Inventor: Thomas L. Hutchinson, Fairmont, WV (US)

(73) Assignee: Swanson Industries, Inc., Morgantown, WV (US)

( * ) Notice: Subject to any disclaimer, the term of this patent is extended or adjusted under 35 U.S.C. 154(b) by 0 days.

(21) Appl. No.: 14/173,035

(22) Filed: Feb. 5, 2014

(65) Prior Publication Data

US 2014/0150684 A1 Jun. 5, 2014

Related U.S. Application Data

(63) Continuation of application No. 13/647,121, filed on Oct. 8, 2012, now Pat. No. 8,683,924.

(51) Int. Cl.
*B61B 3/00* (2006.01)
*F16M 13/02* (2006.01)

(52) U.S. Cl.
CPC .............. *B61B 3/00* (2013.01); *F16M 13/022* (2013.01)
USPC .............................................. 104/89; 104/94

(58) Field of Classification Search
USPC .................................................... 104/89–95
See application file for complete search history.

(56) References Cited

U.S. PATENT DOCUMENTS

| | | | | |
|---|---|---|---|---|
| 3,830,165 A | * | 8/1974 | Turner | 104/172.4 |
| 3,880,086 A | * | 4/1975 | Khondker | 104/94 |
| 3,926,125 A | * | 12/1975 | Orwin | 104/94 |
| 4,122,778 A | * | 10/1978 | Di Rosa | 104/172.4 |
| 4,147,110 A | * | 4/1979 | Knudsen | 104/172.4 |
| 4,267,778 A | * | 5/1981 | Wilkie | 104/94 |
| 6,058,849 A | * | 5/2000 | Ostholt et al. | 104/93 |
| 6,499,408 B1 | * | 12/2002 | Kundel, Sr. | 104/94 |
| 7,739,959 B2 | * | 6/2010 | Hutchinson | 104/89 |
| 7,798,068 B2 | * | 9/2010 | Nishihara et al. | 104/172.4 |
| 7,850,026 B2 | * | 12/2010 | McKay | 212/315 |
| 7,856,930 B2 | * | 12/2010 | Zaguroli, Jr. | 105/29.1 |
| 2008/0066640 A1 | * | 3/2008 | Hutchinson | 104/89 |

\* cited by examiner

*Primary Examiner* — Jason C Smith
(74) *Attorney, Agent, or Firm* — Spilman Thomas & Battle, PLLC; Richard W. James

(57) ABSTRACT

Apparatuses and methods for a trailer that hangs when not in use and on which material may be transported. The apparatuses include a trailer having a single wheel bracket attached to at least one wheel and a trailer body. The trailer body has a first end and a second end and is attached to the single wheel bracket near the first end. The trailer body has a first coupler at the first end and a second coupler at the second end, the first coupler to attach the trailer to a second trailer and the second coupler to attach the trailer to a third trailer such that the trailer hangs by only the single wheel bracket from the first rolling surface of the beam-type rail when the trailer is not attached to the third trailer.

18 Claims, 6 Drawing Sheets

RAIL-SUPPORTED TRAILER APPARATUSES, SYSTEMS, AND METHODS

CROSS-REFERENCE TO RELATED APPLICATIONS

The present application is a continuation of U.S. patent application Ser. No. 13/647,121, filed Oct. 8, 2012, which is currently pending, that application being incorporated herein in its entirety.

FIELD OF THE INVENTION

The present invention is concerned with a rail supported trailer way and, particularly, with trailer segments that can be coupled to produce the rail supported trailer way.

BACKGROUND OF THE INVENTION

Certain prior rail systems, such as longwall mining monorail systems, support electric cables and hydraulic conduits that extend from the vicinity of the longwall face to an outbye station. Such longwall mining monorail systems are generally dynamic systems in which, as coal is extracted from the operating face, the entire longwall system moves. Therefore, rail support equipment must move as well. The monorail system is, thus, a dynamic system and the design of such monorail systems generally accounts for continual movement of the longwall while the electrical power and hydraulic fluid sources remain stationary and are moved only intermittently. Due to numerous variations in geological conditions and customary designs of longwall mining monorail systems being used at various mining operations, longwall systems may vary with regard to physical layouts and dimensional constraints.

Hydraulic fluid is frequently conveyed from pumps to the longwall face along the monorail via hoses or other conduits such as pipe. Electric power from a power center to the longwall face is also frequently conveyed along the monorail and transmitted via electric cables. Typical longwall mining monorail systems furthermore employ festooning where flexible hydraulic conduits or electrical cables hang in loops as the monorail length contracts.

Traditional rail systems do not, however, permit transfer of tools, equipment, or materials along the rail, which is occupied by the dynamic cable and hose handling equipment. Thus, there is a need for equipment and material transfer apparatuses, systems, and methods associated with such a monorail system such that tools, equipment and other materials can be moved within the limited space available between the travel road access point and the point where the mining equipment is located.

There is a further need for a rail supported trailer.

There is a further need for a rail supported trailer that can move around bends and turnouts in the rail.

There is a further need for a rail supported trailer that can move around bends and turnouts in the rail while remaining within the allotted, available space.

There is a further need for a rail supported trailer that can be stored compactly.

There is a need for a rail supported trailer that can carry non-festooned cables, conduits, or hoses when deployed operationally.

There is a need for a rail supported trailer that can support festooned cables, conduits, or hoses when moving around bends and turnouts.

There is a need for a rail supported trailer that can support festooned cables, conduits, or hoses when stored compactly.

Accordingly, rail supported trailer apparatuses, systems, and methods are provided herein to solve the shortcomings of prior rail systems.

SUMMARY OF THE INVENTION

Embodiments of rail-supported trailer apparatuses, systems and methods are directed to systems, methods and apparatuses for moving material on a rail.

In accordance with one embodiment of a trailer for a beam-type rail, the trailer includes: a single wheel bracket attached to at least one wheel to support the trailer on the beam-type rail and a trailer body having a first end and a second end and attached to the single wheel bracket near the first end, the trailer body having a first coupler at the first end and having a second coupler at the second end, the first coupler to attach the trailer to a second trailer and the second coupler to attach the trailer to a third trailer such that the trailer hangs by only the single wheel bracket from a first rolling surface of the beam-type rail when the trailer is not attached to the second trailer and is not attached to the third trailer.

In accordance with one embodiment of a method of moving material on a series of trailers, the method includes: supporting a first trailer from a beam-type rail by a single wheel bracket attached to the trailer, the first trailer having a first coupler attached to a first end and a second coupler adjacent to a second end; coupling the first coupler to a second trailer; coupling the second coupler to a third trailer; coupling the material to at least one of the first trailer, the second trailer, and the third trailer; and moving the material along the series of first, second, and third trailers.

In accordance with one embodiment of a trailer rotatably attached to a beam-type rail, the trailer includes: a first wheel having a first axle attached to a single wheel assembly to support the trailer on the beam-type rail; a second wheel having a second axle attached to the single wheel assembly to support the trailer on the beam-type rail; and a trailer body hanging from the beam-type rail only by the single wheel assembly, the trailer body having a first end and a second end and attached to the wheel assembly near the first end, the trailer body having a first coupler at the first end and having a second coupler at the second end, the first coupler to attach the trailer to a second trailer and the second coupler to attach the trailer to a third trailer such that the second end of the trailer rotates down away from the beam-type rail when the trailer is not attached to the second trailer and is not attached to the third trailer.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of rail supported trailer apparatuses, systems and methods.

DETAILED DESCRIPTION OF THE INVENTION

Reference will now be made to embodiments of rail supported trailer apparatuses, systems and methods, examples of which are illustrated in the accompanying drawings. Details, features, and advantages of rail supported trailer apparatuses, systems and methods will become further apparent in the following detailed description of embodiments thereof. It is to be understood that the figures and descriptions included herein illustrate and describe elements that are of particular relevance to rail supported trailer apparatuses, systems and methods, while eliminating, for purposes of clarity, other elements found in typical rail systems and methods of use.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
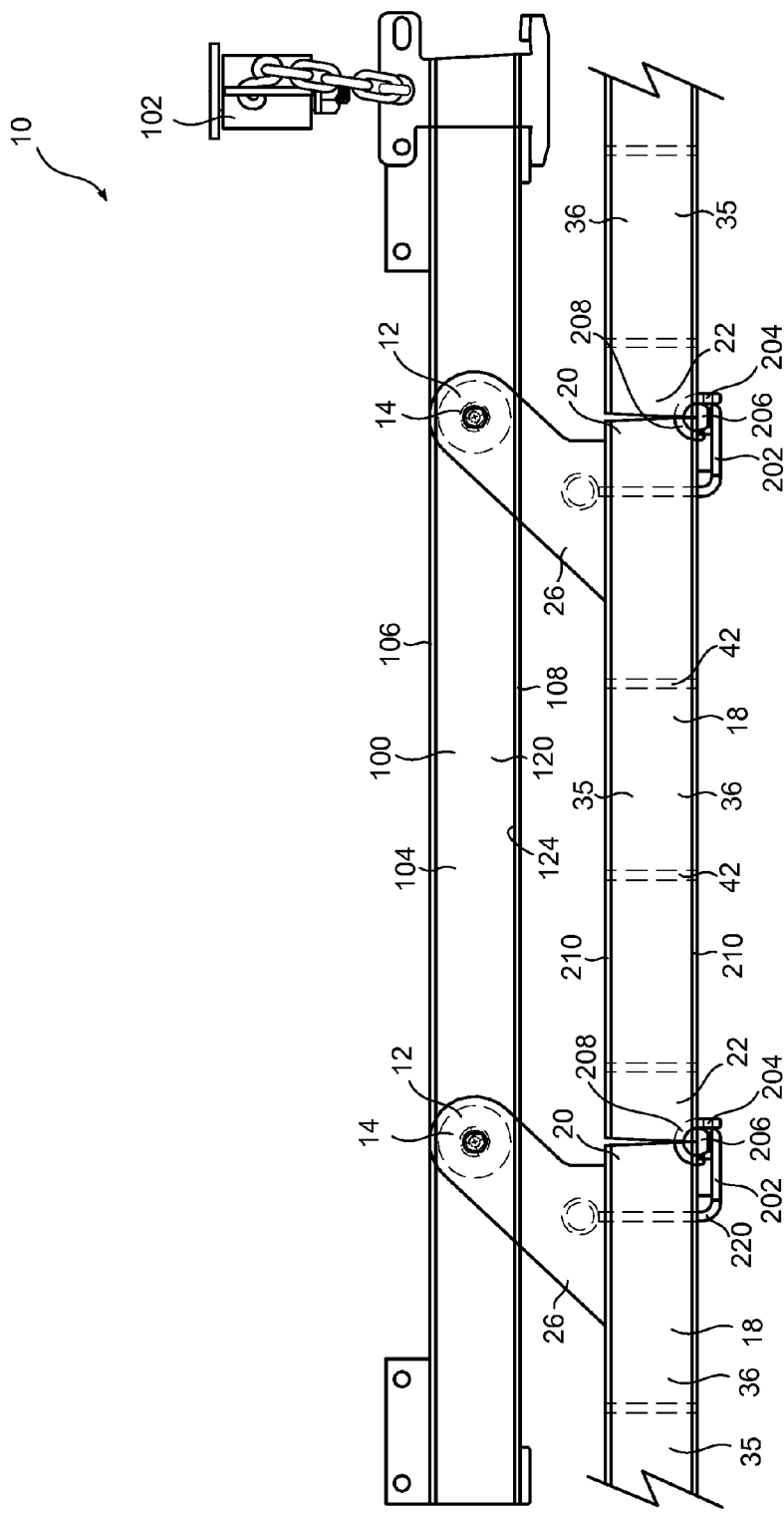
FIG. 1 illustrates a side view of an embodiment of a rail supported trailer system.

FIG. 1 illustrates an embodiment of a rail-supported trailer system 10. The trailer system 10 includes at least one trailer 18 and a rail 100. Each trailer 18 includes a wheel assembly 14 by which the trailer 18 may hang, a trailer body 35, a hitch 202 at one end 20 of the trailer body 35 (and thus trailer 18), and a coupler 204 at an opposite end 22 of the trailer body 35 (and thus trailer 18). The trailer body 35 may include first and second body members 36 and 38 (body member 38 is illustrated on FIG. 2).

The rail 100 supporting the one or more trailers 18 of the rail-supported trailer system 10 may be any type of rail that can support an apparatus that can roll or otherwise move on the rail 100. In the embodiment illustrated in FIG. 1, the rail 100 is a primary monorail used in a deep mining application. In such a deep mining application, the rail 100 may be mounted to the roof of the mine by roof hangers 102. The rail 100 may be a beam-type rail in various embodiments, and may be in the form of an I-beam and may be a wide flange W-beam in certain embodiments. When taking the form of an I-beam, the rail 100 may include a web 104, a first flange 106, and a second flange 108. The second flange 108 may form a first transport way 124 extending out from a first side 120 of the web 104 and a second transport way 126 extending out from a second side 122 of the web 104 opposite the first transport way 124. The transport ways 124 and 126 may furthermore be formed by an upper surface of the second flange 108. The transport ways 124 and 126 may be situated in a substantially horizontal plane if desired, following the roof or other support from which the rail 100 is supported. As such, one or more trailers 18 may be rolled, slid, or otherwise moved along the one or both of the transport ways 124 and 126 and may also be brought to rest along one or both of the transport ways 124 and 126. For example, in an embodiment, the trailer 18 may have two wheels 12, each of which may be supported by one of the transport ways 124 and 126. The two wheels 12 and may each roll along one of the transport ways 124 and 126 to move the trailer 18.

One or more cables, hoses, or conduits 232 (illustrated in FIG. 6) may be supported by one or more cable support brackets 234 that mount to the trailer 18. In an embodiment two cable support brackets 234 are employed at each support point, with one cable support bracket 234 attached to the first trailer body member 36 and a second cable support bracket 234 attached to the second trailer body member 38.

The cable support brackets 234 may be removable. For example, in an embodiment, the cable support brackets 234 may be attached to support non-festooning cables, hoses, or conduits 232, and intermittently removed when the cables, hoses, or conduits 232 are festooning. For example, in an embodiment wherein the trailers 18 are hitched to one another and, thus, in a substantially horizontal position, the cables, hoses, or conduits 232 may be attached to each trailer 18 by one or more cable support brackets 234. When any of the trailers 18 are disconnected from one another, the trailers 18 may be moved closer to one another, thereby causing the cables, hoses, or conduits 232 to festoon. Festooning may be enhanced by removing the cables, hoses, or conduits 232 from the cable support brackets 234 of certain trailers 18, such as every other trailer 18 or from two out of three trailers 18, for example. The cable support brackets 234 that are unused may be removed from the trailers 18 or may be left in place on the trailers 18, as desired.

The cables 232 may carry electrical power, the hoses may carry hydraulic fluid, and the conduits 232 may carry other power or liquids in a mining application, for example. In an embodiment, when the trailers 18 are deployed in a substantially horizontal position, the cables, hoses, or conduits 232 may remain un-festooned and no support brackets 234 may be used, whereas when the trailers 18 are deployed in an unhitched, collapsed, or storage state, the cables, hoses, or conduits 232 may be festooned and supported by one or more cable support brackets 234 at one or more locations.

The wheel assembly 14 of the trailer 18 embodiment depicted in FIG. 1 includes one or more wheels 12 for being supported by and rolling on the rail 100 and one or more wheel brackets 26 and 28. The wheel assembly 14, including the wheel brackets 26 and 28 may retain the one or more wheels 12 in cooperative communication with the trailer 18.

Various numbers of wheels 12 may be used in the wheel assembly 14. For example, in one embodiment, a single-wheeled wheel assembly 14 may be used. In such a single-wheeled wheel assembly 14, a retainer may be used, for example, on the side of the rail 100 opposite the wheel 12, to maintain the wheel 12 in a position such that it rides on the rail 100. Other numbers of wheels 12 may alternately be used in embodiments of the rail-supported trailer system 10, some of which are discussed further herein.

The one or more wheels 12 may furthermore be disposed on a rolling surface such as a flange 108 of the rail 100 and may roll along that flange 108.

Where two wheels 12 are employed, the first wheel 12 may be disposed on the flange 108 on a first side of the web 104 and the second wheel 12 may be disposed on the flange 108 on a second, opposite side of the web 104. In such a two-wheeled embodiment, the web 104 may help to retain the wheels on the flange 108 where, for example, the wheel assembly 14 has a width that is such that the first wheel would contact the web 104 before the second wheel could move to the edge of the flange 108 on the opposite side of the web 104. Such a two-wheeled embodiment could also beneficially balance the trailer 18 and any load carried by the trailer 18 on the rail 100.

As introduced above, the trailer 18 may also include a trailer body 35, which may include one or more body members 36 and 38. The body members 36 and 38 may include a channel or length of rigid material in a desired form and may be made of any desired material including aluminum, stainless steel, or steel. Such material may be treated, for example by anodizing or galvanizing, to protect it from elements in the vicinity of the rail 100. The body members 36 and 38 may be connected to one another directly, indirectly by using webbing or plates extending between the body members 36 and 38, or as desired. The embodiments illustrated in FIGS. 1-3, 5, and 6 use webbing or plates 42 positioned between and attached to each of the body members 36 and 38. The webbing or plates 42 may be made of the same material as the body members 36 and 38 or a different material where, for example, weight or strength considerations dictate another material.

Figure 2:
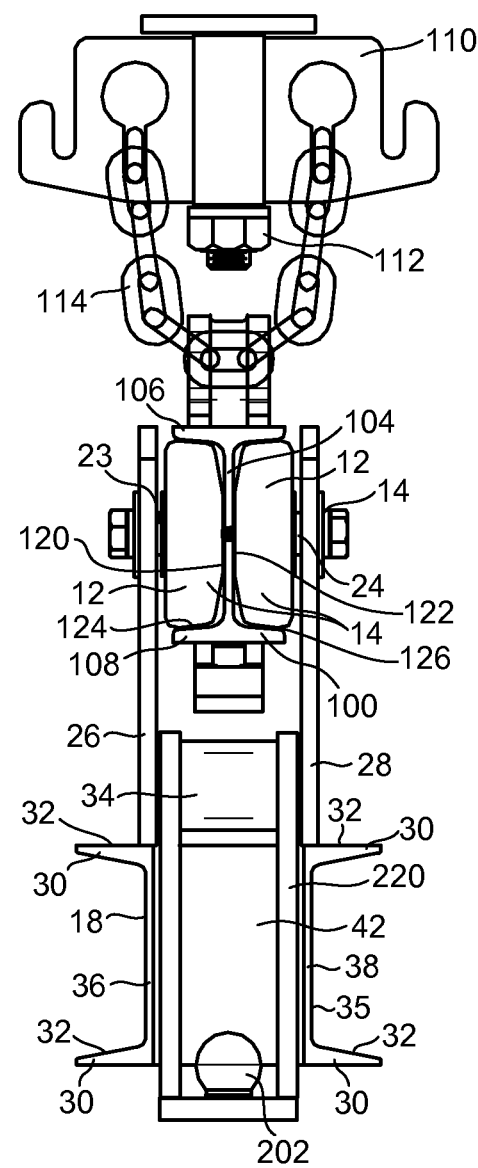
FIG. 2 illustrates an end view of the rail supported trailer system illustrated in FIG. 1.

In an embodiment as illustrated in FIG. 2, which illustrates an end view of the rail-supported trailer system 10 depicted in FIG. 1, there are two body members 36 and 38 formed of lengths of C-shaped stock. The C-shaped body members 36 and 38 illustrated in FIG. 2 are placed back to back with a plate or web 42 between the body members 36 and 38. The plate or web 42 in this embodiment also connects the body members 36 and 38 to one another. The portions of the C-shaped body members 36 and 38 that extend substantially horizontally can furthermore be employed as secondary transport ways 30 that can support transports, which may be hanging or rolling type transports. Thus, in an embodiment, the trailer body 35 of the trailer 18 may include two transport ways 30 that may extend from the first end, the body member 36 comprising the first transport way 30 and the body member 38 comprising the second transport way 30. In embodiments, a vehicle or other device may be transported along one or more transport ways 30, such as along a transport surface 32. The transport surface may be on the lower and/or upper portion of the transport way 30.

In embodiments, the trailer body 35 may be a unitary structure. For example, the trailer body 35 may be a single piece that includes the body members 36 and 38 and a plate or web 42 formed together.

Additionally in FIG. 2, it may be seen that the wheel assembly 14 of this embodiment includes a pair of wheels 12 disposed alongside one another with a gap between the wheels 12. The wheels 12 are attached to wheel brackets 26 and 28 of the wheel assembly 14. The wheel brackets 26 and 28 are connected to the trailer 18 and may be connected to one another by a connecting element 34, such as a pin, bar, web, or other element. The hitch 202 may also attach to the trailer 18 at the connecting element 34 or elsewhere.

The wheel assembly 14 illustrated in FIG. 2, therefore, forms a two-wheeled wheel assembly 14. Such a two-wheeled wheel assembly 14 can be advantageous for various reasons including the ability of wheels 12 arranged on the two-wheeled wheel assembly 14 to circumnavigate a sharper turn in the rail 100 than a four-wheeled wheel assembly might have the capacity to circumnavigate. The two-wheeled wheel assembly 14 can also be advantageous in that the wheels 12 may require less space on the rail 100 than a 4-wheeled wheel assembly 14. Space saving may be particularly advantageous when a collapsible trailer 18 is attached to the two-wheeled wheel assembly 14, thereby permitting the unhitched, collapsed trailers 18 to occupy a minimal space on the rail 100. It may also be recognized that a two-wheeled wheel assembly 14 may be employed, rather than 4-wheeled wheel assemblies 14, for example, where the weight borne by the wheel assembly 14 is reduced or the distance between the two-wheeled wheel assemblies 14 is reduced.

The wheels 12 of the rail-supported trailer system 10 illustrated in FIGS. 1 and 2 are attached to the wheel assembly 14 by separate axles 23 and 24 shown in FIG. 2. Each axle 23 and 24 may extend through a respective wheel bracket 26 and 28 of the wheel assembly 14 and a wheel 12, thereby rotatably fastening the wheel 12 to the wheel assembly 14.

Alternately, a wheel assembly 14 employing four or another number of wheels may be used in embodiments of the rail-supported trailer system 10.

FIG. 2 further illustrates an embodiment of a roof-hung rail 100 that is supported by a roof hanger 110 attached to a roof by way of a roof bolt 112. A chain 114 hangs in a loop from the roof hanger 110 and the rail 100 is hung from the chain 114. It should be recognized that rails 100, including longwall mine transport rails, may be disposed in a variety of ways and the rail-supported trailer system 10 may be employed with many or all of those rail 100 disposition embodiments.

Figure 4:
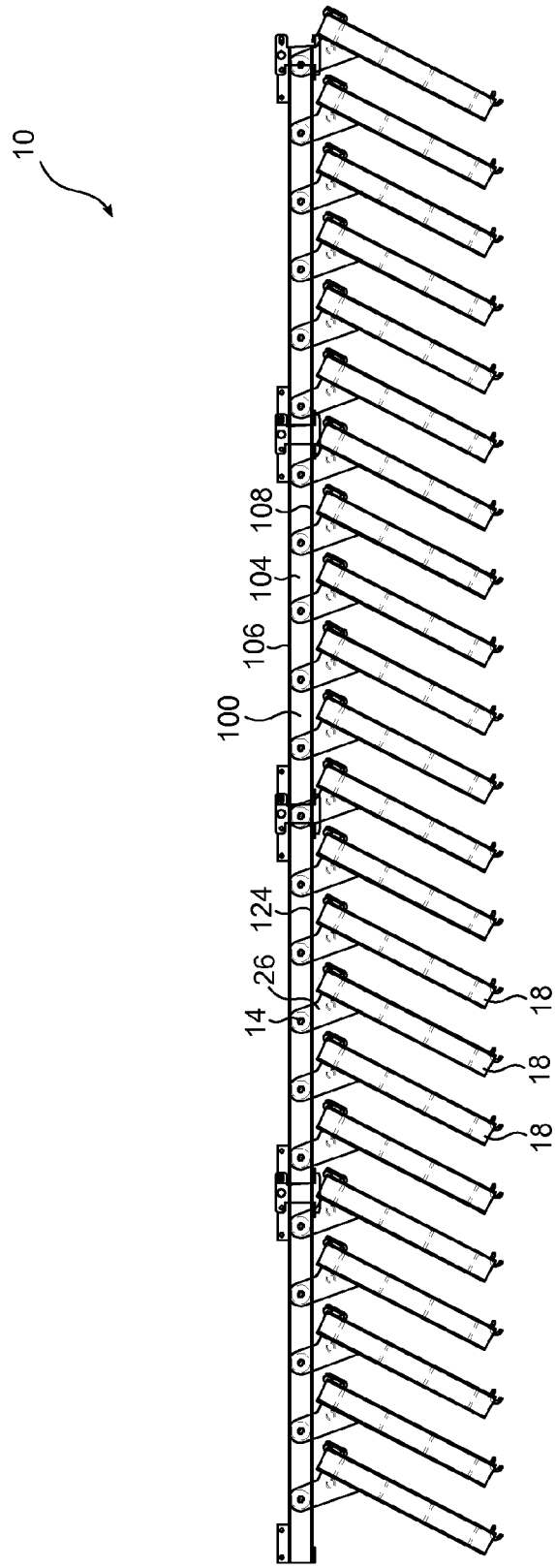
FIG. 4 illustrates an embodiment of a rail supported trailer system with a plurality of trailers that are not attached to one another.

The trailer 18 may be rotatably connected to the wheel assembly 14 or may be rotated in relation to the rail 100 by rotating the wheel assembly 14 and trailer 18 about the wheel 12 axles 23 and 24. A rotatable trailer 18 may beneficially be unhitched and stored in a small area, as illustrated in FIG. 4.

As illustrated in FIG. 1, the hitch assembly 220 may comprise a hitch 202 and a coupler 204. In an embodiment, the hitch 202 may comprise a ball 206, such as a ball similar to that used on a vehicle for attaching a trailer for towing behind the vehicle and a coupler 204, such as a tongue 208 that rests on and is rotatably clamped onto the ball 206.

The hitch 202 may be fixed or rotatably attached near the first end 20 of the trailer 18. In the embodiment shown in FIG. 1, the hitch 202 is fixedly attached to the trailer 18, extending to a connection on the connecting element 34 (shown in FIG. 2), such that a second trailer 18 can be attached to a first trailer 18 by rotating the second end of the second trailer 18 such that the coupler 204 of the second trailer 18 is above the hitch 202 of the first trailer 18 and then lowering the coupler of the second trailer 18 over the hitch 202 of the first trailer 18.

Thus, a method for hitching a ball 206 type hitch 202 that is fixedly attached to a trailer 18 includes rotating a first trailer 18 to a substantially horizontal position, rotating a second trailer 18 to a substantially horizontal position with the coupler 204 of the second trailer 18 being above the hitch 202 of the first trailer 18, and placing the coupler 204 of the second trailer 18 near the second end 20 of the first trailer 18, such as against the ball 206 of the hitch 202.

A method for hitching a ball 206 type hitch 202 that is rotatably attached to a trailer 18 includes rotating a first trailer 18 to a substantially horizontal position, rotating a second trailer 18 to a substantially horizontal position, placing the coupler 204 of the second trailer 18 near the second end 20 of the first trailer 18, and rotating the hitch 202 of the first trailer 18 into the coupler 204 of the second trailer 18. The hitch 202 of the first trailer 18 may then be locked into place by, for example, locking the hitch 202 of the first trailer 18 with the coupler 204 of the second trailer 18 via the ball 206 or locking the hitch 202 of the first trailer 18 with the second trailer 18 itself.

The rail-supported trailer system 10 may also include a wheeled-end support (not shown). The wheeled-end support may include a wheel assembly 14 and a hitch 202 or coupler 204 for attachment to an end of a string of hitched trailers 18. The wheeled-end support may be used to support an end of a trailer 18 in a string that would hang if left unsupported. In an embodiment, the wheeled-end support may appear as the coupler end 22 of a trailer 18 and may serve the purpose of holding the last trailer 18 in a substantially horizontal position so that the last trailer 18 does not hang down.

Figure 3:
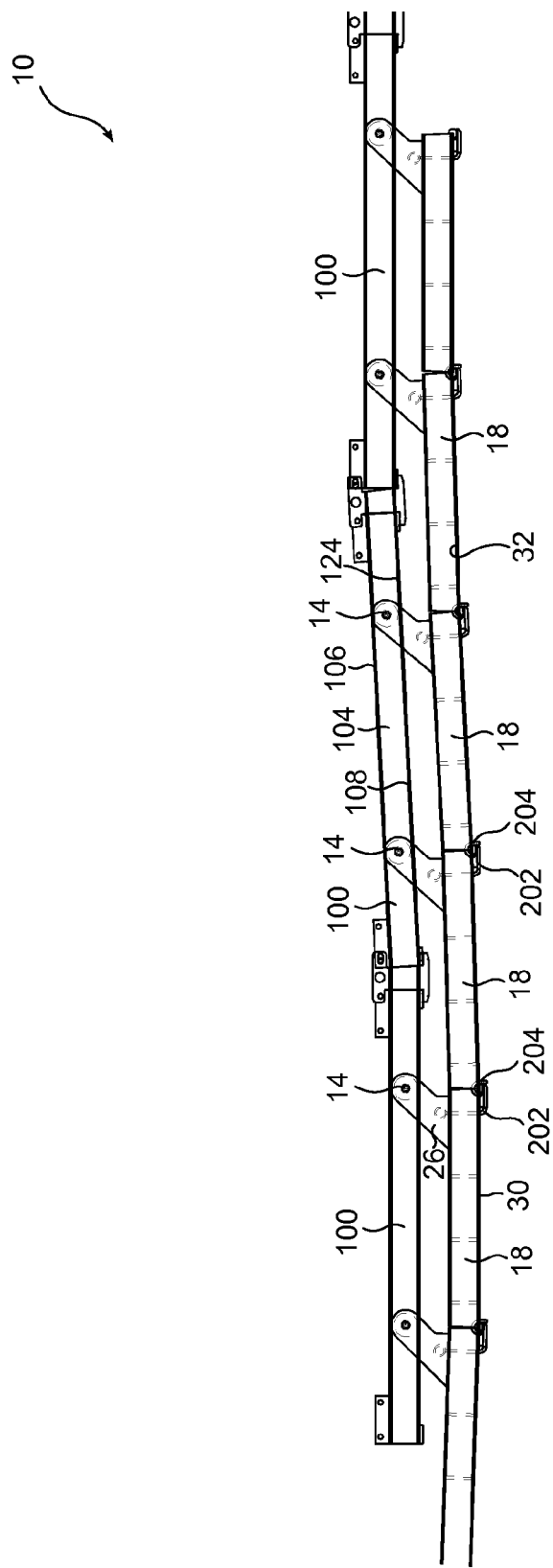
FIG. 3 illustrates another embodiment of a rail supported trailer system with a plurality of trailers attached end to end to one another.

FIG. 3 illustrates an embodiment of the rail-supported trailer system 10 in which a series of trailers 18 have been disposed in a horizontal orientation and hitched together. In the embodiment illustrated in FIG. 3, the hitch 202 is of a ball-type, which may be similar to a hitch used commonly for attachment of a trailer to a vehicle, and the trailers 18 are of a length such that the trailers 18 can articulate horizontally at their connection points (e.g., hitch 202 and coupler 204) to permit the trailers to negotiate a turn, such as a turnout or switch point. The trailers 18 may be of a length not greater than the distance from the rail 100 to any floor beneath the rail 100 so that the trailers 18 can hang vertically or nearly vertically (an embodiment of which is illustrated in FIG. 4), for example to minimize storage space required for unused trailers 18. Trailer 18 length may also be selected based on space around the rail 100.

Use of a ball-type hitch 202 also permits the trailers to articulate vertically, such that the trailers 18 can negotiate various bends in the rail 100, including horizontal, vertical, and combination horizontal and vertical turns.

Rail 100 turns that are primarily horizontal, also called turnouts, may exist in a rail 100 system for various reasons. Turnouts may include turns in a rail 100 to divert the rail around an obstruction or a leg of rail 100 that turns off the main rail system. Such a turnout may exist, for example, at either end of the rail 100 system and may be used to: load trailers 18 onto the rail 100 or remove trailers 18 from the rail 100; load or unload material or equipment being transported on independent vehicles, such as skid or wheeled transport vehicles, to be suspended from the trailers 18; store one or more trailers 18; or simply to move one or more trailers 18 out of the way of other equipment, for example.

Use of a two-wheeled wheel assembly 14 may beneficially facilitate a trailer 18 negotiating or traveling along a turnout. That may be true, for example, because wheels that are aligned, such as the wheels on the same side of a 4-wheeled wheel assembly 14, rather than wheels that are opposite one another, as in a two-wheeled wheel assembly 14, may bind against the rail 100 in a small radius bend or turnout or a small radius portion of a bend or turnout. Furthermore, short radius turns are generally preferred in mining and other applications because, for example, short radius turns can save space.

When two or more trailers 18 are coupled by way of the hitch 202 of a first trailer 18 being coupled to the coupler 204 of a second trailer 18, the plurality of coupled trailers 18 forms an articulating, semi-flexible transport pathway, comprising a plurality of transport ways 30 included in the trailer bodies 35, capable of supporting and on which may be transported, an independent vehicle. An embodiment of such a transport pathway of adjacent transport ways 30 is illustrated in FIG. 3. The trailers 18 may be of a length that permits the trailers 18 to articulate around a turnout or bend in the main rail 100 without extending an undesirably too great distance away from the rail 100. For example, when a plurality of trailers 18 are hitched together to form a substantially horizontal transport pathway of transport ways 30, each trailer 18 may remain rigid as it turns the bend and the hitch 202 and coupler 204 used to connect the trailers 18 may rotate in relation to one another such that an angle is formed between adjacent trailers 18 when the trailers 18 move around a bend or turnout. The length of the trailers 18 may form a chord with the arc of the curved rail 100 while negotiating the turnout. Maintaining a minimal horizontal distance between the chord formed by the trailer 18 and the curved rail 100 is typically desirable. When the trailers 18 are, for example, 3' in length and a series of them articulate around a turnout having a 20 foot radius, the trailers may extend laterally out from the center point of the rail 100 only an acceptable distance while negotiating the turnout.

The transport pathway of transport ways 30 of the coupled trailers 18 may include transport surfaces 32 along which the independent vehicles may roll or slide. In embodiments, the transport surface 32 of each transport way 30 may be on the lower and/or upper portion of the transport way 30 as shown in FIG. 2. The independent vehicles that may be transported along the transport pathway include, for example: material handling transports; load-bearing carriers; platforms; suspension hooks; motive power sources including manually-powered engines, pneumatically-powered engines, hydraulically-powered engines, and electrically-powered engines; apparatuses for managing power distribution to motive power sources including, for example, reels, festooning trailer systems, and manual handling systems; and vehicles that carry supplies, tools, or other equipment. In embodiments, certain vehicles may not be able to be transported through sections of transport ways 30 in which cables, hoses, or conduits 232 are festooned.

FIG. 4 illustrates an embodiment of the rail-supported trailer system 10 in which a series of trailers 18 have been disposed in an unhitched state. As may be seen by reference to FIG. 4, the trailers 18 can be collapsed into a smaller space along a rail 100 when unhitched. For example, in one embodiment, unhitched trailers 18 can be placed in a rail 100 space one-third the size those same trailers 18 would require when hitched to one another.

Figure 5:
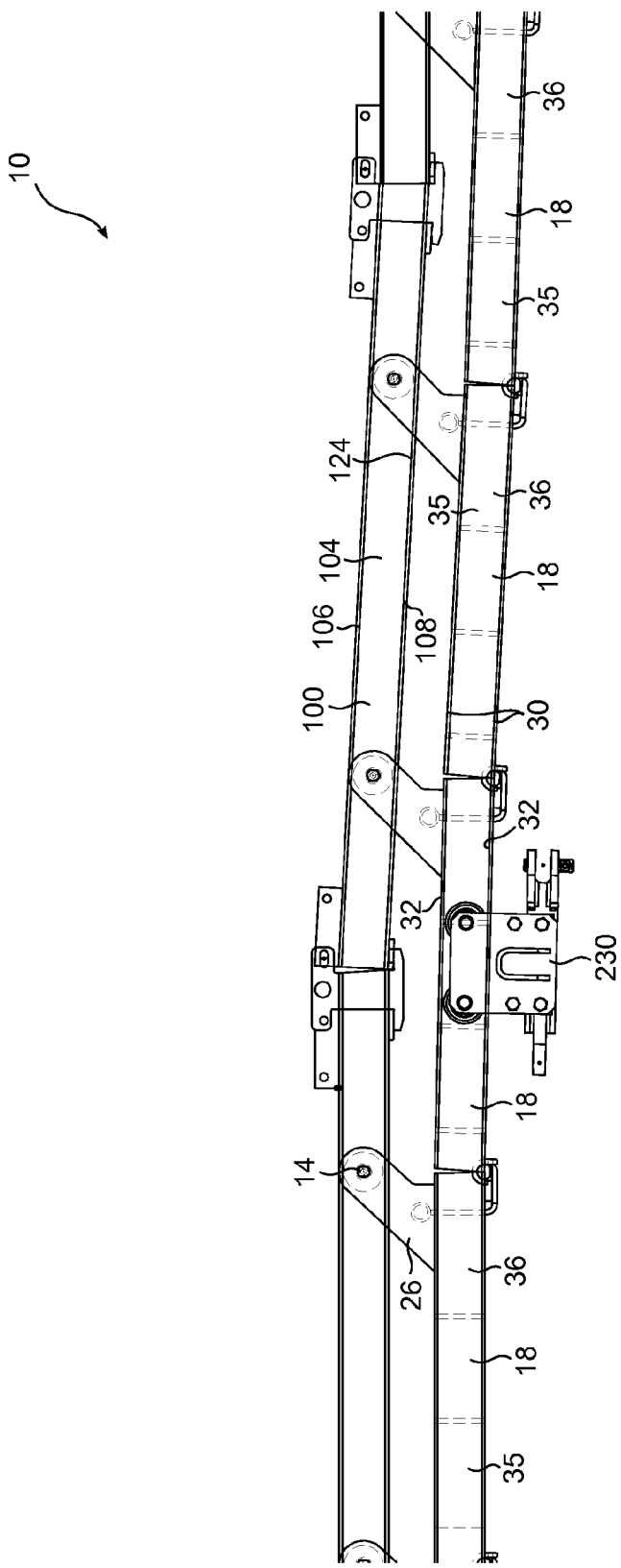
FIG. 5 illustrates an embodiment of a rail supported trailer system with a support carrier riding in the trailer system.

FIG. 5 illustrates an embodiment of the rail-supported trailer system 10 in which a transport 230 is suspended by a trailer 18 by being supported by the transport way 30 of the trailer 18, and specifically by the lower transport surface 32 of the transport way, though in another embodiment the transport 230 could be supported by the upper transport surface 32. The transport 230 may carry material and thereby couple the material to one or more trailers 18. As may be seen in FIG. 5, the rail 100 may be substantially horizontal, but may have portions that angle up or down, for example, to hang from the uneven ceiling of a longwall mining operation. As may also be seen in FIG. 5, the trailers 18 may hang at a regular spacing from the rail 100 such that they too may be substantially horizontal, but may also angle up and down to meet the needs of the circumstances in which they are employed, such as to conform to the angles of the rail 100.

The material carried by the transport 230 may thus move along the beam-type rail 100 by moving a trailer or trailers 18 to which the transport 230 or other material-carrying element is coupled and/or moving the transport 230 along the trailer or trailers 18. For example, in an embodiment the trailer or trailers 18 may be coupled with a material-carrying transport 230 and may move along the rail 100 by having their wheels 12 roll along one or both of the transport ways 124 and 126 of the rail 100. Alternatively or in addition, the transport 230 may move along the beam-type rail 100 by moving along the trailer or trailers 18, such as by moving along the lower or upper transport surface 32 of the transport way.

Figure 6:
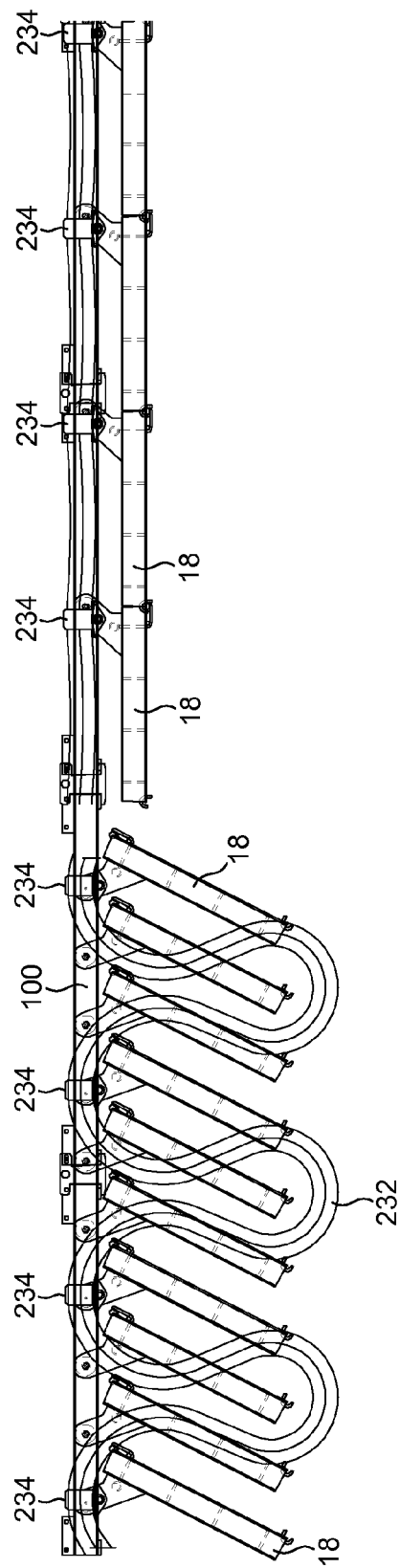
FIG. 6 illustrates an embodiment of a rail supported trailer system with unattached trailers in a cable or conduit festooning portion of a rail and interconnected trailers in a non-festooning portion of the rail.

FIG. 6 illustrates an embodiment of a rail 100 supporting festooning and un-festooning cable and/or conduit 232, as well as trailers 18. As may be seen in FIG. 6, cables or conduits 232 may be festooned and unhitched trailers 18 may be stored in a section of the rail 100. Alternately, or in addition, trailers 18 may be stored on a section of rail 100 where cables or conduits 232 are not festooning.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed, is:

1. A trailer for a beam-type rail, the trailer comprising:
 a single wheel bracket attached to at least one wheel to support the trailer on the beam-type rail; and
 a trailer body having a first end and a second end and attached to the single wheel bracket near the first end, the trailer body having a first coupler at the first end and having a second coupler at the second end, the first coupler to attach the trailer to a second trailer and the second coupler to attach the trailer to a third trailer such that the trailer hangs by only the single wheel bracket from a first rolling surface of the beam-type rail when the trailer is not attached to the second trailer and is not attached to the third trailer.

2. The trailer of claim 1, further comprising a travel-way formed on the trailer so that a transport may hang from the trailer and move along the travel-way and onto a travel-way of the second trailer when the trailer is attached to the second trailer.

3. The trailer of claim 1, wherein the trailer is attached to the single wheel bracket by a connecting element.

4. The trailer of claim 3 wherein the connecting element is a pin.

5. The trailer of claim 4 wherein the trailer rotates about the pin.

6. The trailer of claim 5 wherein the trailer rotates to a substantially horizontal position for attachment to the second trailer and the trailer rotates downwardly to hang from the single wheel bracket.

7. The trailer of claim 1, wherein the trailer body includes a transport way extending from the first end to the second end of the trailer body.

8. The trailer of claim 7, wherein the trailer body further comprises a second transport way extending from the first end to the second end of the trailer body.

9. The trailer of claim 7, wherein a transport is supported by the transport way.

10. The trailer of claim 9, wherein the transport is to roll along the transport way.

11. The trailer of claim 9, wherein the transport is to slide along the transport way.

12. The trailer of claim 1, wherein at least one of a conduit, a hose, and a cable is supported by a cable support bracket that is removably attached to the trailer.

13. The trailer of claim 1, the trailer further comprising a second wheel attached to the wheel bracket.

14. The trailer of claim 13, wherein the at least one wheel is attached to the wheel bracket by a first axle and a second wheel is attached to the wheel bracket by a second axle such that the trailer is rotatable about the first axle and the second axle.

15. The trailer of claim 1, wherein the wheels are opposite one another.

16. The trailer of claim 1, wherein the first axle and the second axle are coaxial.

17. The trailer of claim 1, wherein the trailer has a length from the first end to the second end and the trailer is substantially parallel to the beam-type rail when the first coupler is attached to the second trailer and the second coupler is attached to the third trailer.

18. A trailer rotatably attached to a beam-type rail, the trailer comprising:
 a first wheel having a first axle attached to a single wheel assembly to support the trailer on the beam-type rail;
 a second wheel having a second axle attached to the single wheel assembly to support the trailer on the beam-type rail; and
 a trailer body hanging from the beam-type rail only by the single wheel assembly, the trailer body having a first end and a second end and attached to the wheel assembly near the first end, the trailer body having a first coupler at the first end and having a second coupler at the second end, the first coupler to attach the trailer to a second trailer and the second coupler to attach the trailer to a third trailer such that the second end of the trailer rotates down away from the beam-type rail when the trailer is not attached to the second trailer and is not attached to the third trailer.

* * * * *